United States Patent
Wichmann

(10) Patent No.: US 10,648,461 B2
(45) Date of Patent: May 12, 2020

(54) METERING PUMP AND METERING SYSTEM

(71) Applicant: BASF SE, Ludwigshafen (DE)

(72) Inventor: Wolf-Dieter Wichmann, Neetzow (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 16/253,541

(22) Filed: Jan. 22, 2019

(65) Prior Publication Data

US 2019/0154017 A1 May 23, 2019

Related U.S. Application Data

(63) Continuation of application No. 14/894,799, filed as application No. PCT/EP2014/061480 on Jun. 3, 2014, now Pat. No. 10,221,838.

(30) Foreign Application Priority Data

Jun. 5, 2013 (EP) ..................... 13170604

(51) Int. Cl.
*F04B 9/105* (2006.01)
*F04B 9/109* (2006.01)
(Continued)

(52) U.S. Cl.
CPC .......... *F04B 9/1056* (2013.01); *F04B 9/1095* (2013.01); *F04B 9/111* (2013.01);
(Continued)

(58) Field of Classification Search
CPC ...... F04B 9/1056; F04B 9/1095; F04B 9/113; F04B 9/111; F04B 13/00; F04B 13/02; F04B 49/14; F04B 49/16
See application file for complete search history.

(56) References Cited

U.S. PATENT DOCUMENTS

| | | | |
|---|---|---|---|
| 305,972 A * | 9/1884 | Sjogren .................. | F04B 9/113 417/397 |
| 2,004,474 A * | 6/1935 | Schaer .................... | F04B 49/16 417/277 |

(Continued)

*Primary Examiner* — Charles G Freay
*Assistant Examiner* — Thomas Fink
(74) *Attorney, Agent, or Firm* — Marshall, Gerstein & Borun LLP

(57) ABSTRACT

The invention relates to a metering pump having a hydraulic drive (12) for supplying a hydraulic fluid under pressure. The metering pump furthermore comprises a housing (2) and an oscillating piston (3), which is accommodated in the housing (2) in such a way that at least a first and a second hydraulic chamber (9-1, 9-2) and a first (6-1) and a second delivery chamber (6-2) are formed, wherein the oscillating piston (3) has at least a first driving surface (10-1) in the first hydraulic chamber (9-1) and at least a second driving surface (10-2) in the second hydraulic chamber (9-2), and the hydraulic chambers (9-1, 9-2) communicate with the hydraulic drive, thus enabling the oscillating piston (3) to be moved backward and forward between a first and a second position by the hydraulic fluid, wherein, during the movement from the first to the second position, the volume of the first delivery chamber (6-1) is enlarged and the volume of the second delivery chamber (6-2) is reduced and, during the movement from the second to the first position, the volume of the second delivery chamber (6-2) is enlarged and the volume of the first delivery chamber (6-1) is reduced. The invention furthermore relates to a metering system for mixing two fluids and a metering system for metering at least one fluid.

11 Claims, 5 Drawing Sheets

Figure 1:
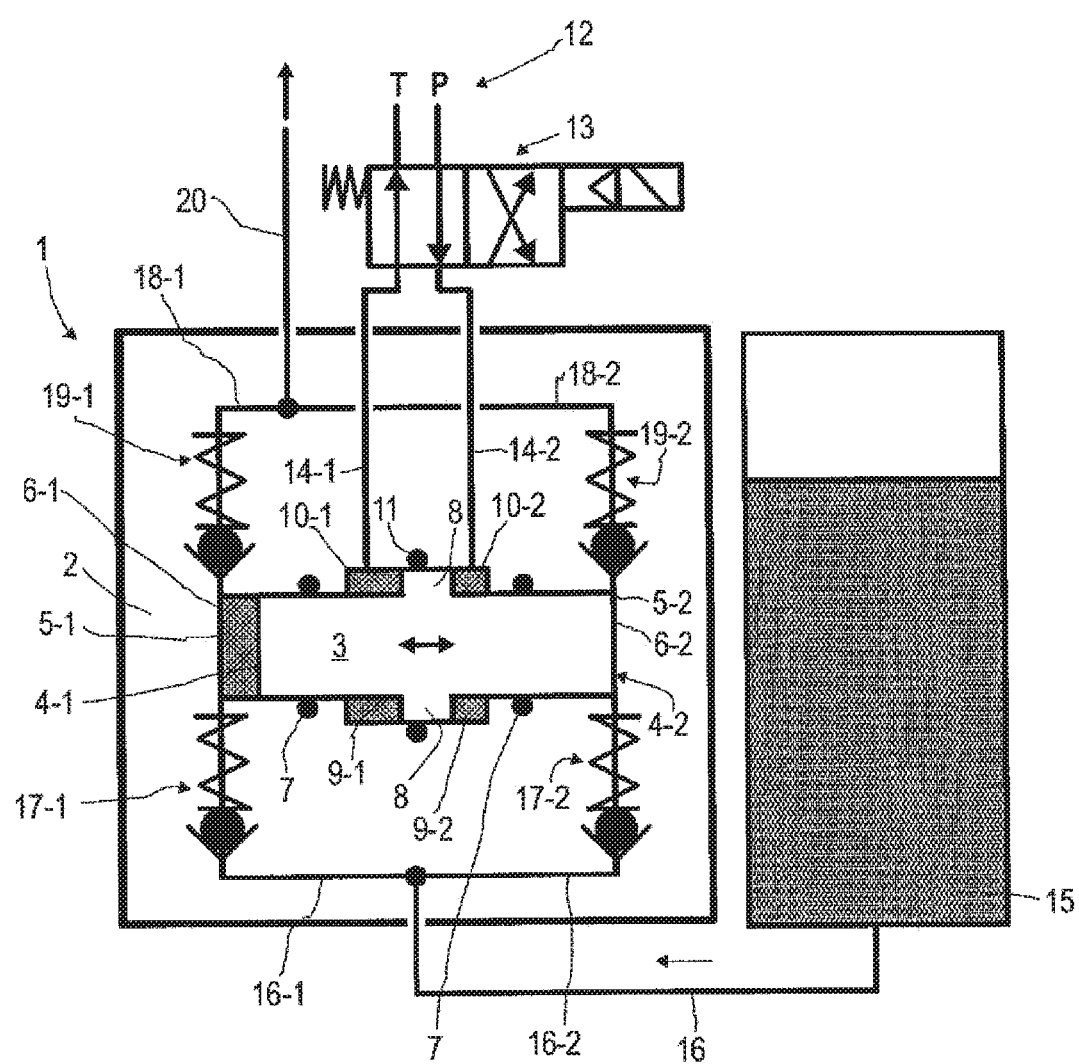

(51) Int. Cl.
  *F04B 9/111* (2006.01)
  *F04B 9/113* (2006.01)
  *F04B 13/00* (2006.01)
  *F04B 13/02* (2006.01)
  *B29B 7/60* (2006.01)

(52) U.S. Cl.
  CPC .............. *F04B 9/113* (2013.01); *F04B 13/00* (2013.01); *F04B 13/02* (2013.01); *B29B 7/603* (2013.01)

(56) References Cited

U.S. PATENT DOCUMENTS

| | | | | |
|---|---|---|---|---|
| 3,901,408 A * | 8/1975 | Boden | ................ | B01F 15/0237 222/134 |
| 3,938,425 A * | 2/1976 | Kroffke | ................ | F04B 9/107 92/60.5 |
| 3,940,995 A * | 3/1976 | Harris, Sr. | ......... | G01N 35/1079 73/863.81 |
| 3,972,652 A * | 8/1976 | Minnicino | ............. | F04B 49/16 417/277 |
| 4,076,465 A * | 2/1978 | Pauliukonis | ......... | F01B 11/007 417/339 |
| 4,087,209 A * | 5/1978 | Mahig | ..................... | F04B 5/00 417/268 |
| 4,286,929 A * | 9/1981 | Heath | .................. | F01B 11/001 417/404 |
| 4,423,664 A * | 1/1984 | Buchl | ................... | F15B 15/24 60/546 |
| 4,543,787 A * | 10/1985 | Eckhardt | ............. | F16H 61/472 60/444 |
| 4,622,884 A * | 11/1986 | Buchl | ................... | A01B 63/22 137/512 |
| 4,646,620 A * | 3/1987 | Buchl | ................... | F15B 15/24 172/4 |
| 4,761,118 A * | 8/1988 | Zanarini | ................ | F04B 9/115 417/254 |
| 5,049,040 A * | 9/1991 | Diab | ...................... | F04B 49/16 417/274 |
| 5,489,006 A * | 2/1996 | Saiia | ...................... | B62D 5/12 180/421 |
| 5,588,813 A * | 12/1996 | Berke-Jorgensen | ... | B67D 1/107 417/391 |
| 6,135,719 A * | 10/2000 | Yoder | ................... | F04B 9/105 137/551 |
| 6,270,323 B1 * | 8/2001 | Hsu | ........................ | F04B 9/105 417/399 |
| 6,435,843 B1 * | 8/2002 | Hur | ........................ | F04B 9/115 417/393 |
| 9,841,015 B2 * | 12/2017 | Wichmann | ............. | F04B 51/00 |
| 2007/0286745 A1 * | 12/2007 | Chance | ............... | B01F 5/0685 417/397 |
| 2009/0026220 A1 * | 1/2009 | Ramnarine | ............ | F04B 9/125 222/1 |
| 2009/0124974 A1 * | 5/2009 | Crank | ................ | A61B 17/3478 604/118 |
| 2010/0172771 A1 * | 7/2010 | Hoffarth | ................... | F04B 5/02 417/393 |
| 2012/0137667 A1 * | 6/2012 | Jacobsen | ................ | B60K 6/12 60/327 |
| 2015/0053075 A1 * | 2/2015 | Rabhi | .................... | F04B 9/113 91/417 R |

* cited by examiner

METERING PUMP AND METERING SYSTEM

This application is a continuation of U.S. application Ser. No. 14/894,799, filed Nov. 30, 2015, the entirety of which is hereby incorporated herein by reference. U.S. application Ser. No. 14/894,799 is a National Stage Application of International Application No. PCT/EP2014/061480, filed Jun. 3, 2014. U.S. application Ser. No. 14/894,799 also claims the priority benefit of European Application No. 13170604.6, filed Jun. 5, 2013, the entireties of which are hereby incorporated herein by reference.

The present invention relates to a metering pump for delivering and metering a fluid. The invention furthermore relates to a metering system for mixing two fluids and to a metering system for metering at least one fluid.

Piston-type metering pumps of various designs which have various delivery ranges are known. There are usually driven electrically or pneumatically. However, there are areas of application in which a pneumatic or electric drive cannot be used since, for example, no air pressure can be generated for the pneumatic drive and there is insufficient electric energy available to drive the metering pump electrically.

Moreover, there are areas of use, especially in the agricultural sector when metering plant protection products, for which very accurate metering over a very large delivery range is required. Admittedly, it is possible to meter accurately defined quantities with conventional metering pumps. However, such metering pumps then have only a very narrow range within which the metered quantity can be adjusted. On the other hand, there are metering pumps, the metered volumes of which can be adjusted over a very wide range. However, the accuracy with which metering is then carried out is low.

It is therefore the underlying object of the invention to specify a metering pump and a metering system which can be used in a flexible manner and/or by means of which very accurate metering over a wide, adjustable metering range is possible.

According to the invention, this object is achieved, in respect of a first aspect of the invention, by a metering pump having the features of claim 1 and by a metering system having the features of claims 8 and 9, and in respect of a second aspect by a metering pump having the features of claim 12 and by a metering system having the features of claim 19. Advantageous embodiments and developments will be found in the dependent claims.

The metering pump according to the invention comprises a hydraulic drive for supplying a hydraulic fluid under pressure. The metering pump furthermore has a housing and an oscillating piston, which is accommodated in the housing in such a way that at least a first and a second hydraulic chamber and a first and a second delivery chamber are formed. Furthermore, the metering pump has an adjusting device, which is coupled to the oscillating piston in such a way that the movement of the oscillating piston can be limited in such a way that different minimum and/or maximum volumes can be set for at least one of the delivery chambers. In this case, the oscillating piston has at least a first driving surface in the first hydraulic chamber and at least a second driving surface in the second hydraulic chamber. The hydraulic chambers communicate with the hydraulic drive, thus enabling the oscillating piston to be moved backward and forward between a first and a second position by the hydraulic fluid. During the movement from the first to the second position, the volume of the first delivery chamber is enlarged and the volume of the second delivery chamber is reduced. During the movement from the second to the first position, in contrast, the volume of the second delivery chamber is enlarged and the volume of the first delivery chamber is reduced. Furthermore, the adjusting device comprises at least one stop piston, which limits the space in the delivery chamber which is assigned to the stop piston.

The metering pump according to the invention can be used to advantage even when the pump cannot be driven by means of an electric or pneumatic drive. The metering pump according to the invention can also be employed, for example, on a vehicle or an agricultural or construction machine for metering liquid media where electric energy and compressed air for driving one or more metering pumps are available only to a very limited extent. If the metering pump is employed to dispense plant protection products, for example, a not inconsiderable amount of motive power is required, and this can be made available hydraulically but not electrically by the vehicle. This is because many agricultural vehicles and construction machines are fitted with a powerful onboard hydraulic system which enables the oscillating piston of the metering pump to be driven.

In the case of the metering pump according to the invention, the hydraulic fluid acts directly on the driving surfaces of the oscillating piston. In particular, the oscillating piston is driven directly by hydraulic means. This means that there is no mechanical power transmission between the hydraulic drive and the oscillating piston, and therefore the hydraulic pressure acts directly on the driving surfaces of the oscillating piston in order to move and drive the latter. Admittedly, it is possible to generate a very high pressure for delivery of the fluid by means of a direct hydraulic drive of this kind. With a hydraulic drive, however, there is the problem that the piston of a conventional piston pump has very high positive and negative acceleration. Moreover, very high piston speeds occur. Owing to the generally very low resistance during intake, the acceleration and speed of the piston in a hydraulic drive are very high during the intake of the fluid to be delivered. As a consequence, the fluid to be delivered can no longer match the speed of the piston during intake, and cavitation occurs. In cavitation, vapor-filled cavities form in the liquid to be metered. The vapor bubbles collapse again during delivery of the liquid. This can lead to mechanical damage in the metering pump. Moreover, this prejudices the accuracy of metering.

According to the invention, the occurrence of cavitation in the hydraulically driven metering pump is avoided by virtue of the fact that the oscillating piston is moved backward and forward in two opposite delivery chambers. In this case, the acceleration of the oscillating piston during the intake of fluid into the first delivery chamber is damped by the opposing delivery of the fluid from the second delivery chamber. Thus, delivery from the second delivery chamber damps the movement of the oscillating piston during the intake of fluid into the first delivery chamber. Conversely, delivery of the fluid from the first delivery chamber damps the acceleration of the oscillating piston during the intake of fluid into the second delivery chamber. Thus, the resistance on the delivery side is in each case used to brake the movement of the oscillating piston on the intake side. It is only this special configuration of the metering pump according to the invention which allows the use of a hydraulic drive. Cavitation problems of this kind do not usually occur with electrically and pneumatically driven metering pumps, and therefore the design of such metering pumps cannot readily be applied to metering pumps with a hydraulic drive.

In particular, the two driving surfaces are aligned in such a way relative to the hydraulic chambers that a pressure of the hydraulic fluid in the first hydraulic chamber on the first driving surface moves the oscillating piston from the first to the second position and a pressure of the hydraulic fluid in the second hydraulic chamber on the second hydraulic surface moves the oscillating piston from the second to the first position.

In particular, the two delivery chambers are completely separate from one another. They each have at least one inlet line and one outlet line, which open into the respective delivery chamber.

In particular, the oscillating piston has two sides. On the first side, the oscillating piston has a first delivery surface in the first delivery chamber. In particular, this first delivery surface is aligned in exactly the same way as the first driving surface. On the other side, the oscillating piston likewise has a second delivery surface, which is arranged in the second delivery chamber and is aligned in the same way as the second driving surface.

According to one embodiment of the metering pump according to the invention, the two driving surfaces are of annular design. The two delivery surfaces can be in the form of circular disks, for example. In particular, they are formed on the two end faces of the oscillating piston. The driving surfaces can be formed by projections in the central area of the oscillating piston, for example.

According to a development of the metering pump according to the invention, the adjusting device is especially designed in such a way that the minimum volumes of the delivery chambers are generally zero. This means that fluid present in the delivery chamber is forced completely out of the delivery chamber at the respective outermost reversal point of the oscillating piston. In this case, however, the respective maximum volume of the delivery chamber can be set by the adjusting device. It is thereby advantageously possible to set different metering volumes.

As a result of the adjusting device, the metering pump according to the invention can advantageously be employed if the delivery volume is to be adjustable over a very wide range while nevertheless ensuring accurate metering.

The metering pump according to this development of the invention can furthermore advantageously be employed in conjunction with fluids in which sedimentation of solid particles is likely to occur. In such a case, it is necessary to agitate or circulate the fluid supply before metering the fluid. The metering pump according to the invention can advantageously be used both for metering and for agitating or circulating the fluid supply. With the metering pump according to the invention, it is possible accurately to meter a relatively small volume flow and, at the same time, also to deliver a relatively high volume flow for agitation and circulation of the fluid to be metered. By means of the adjusting device, it is possible to change between these two operating modes easily and quickly.

By means of the stop piston of the adjusting device in particular the stroke of the oscillating piston is limited.

The adjusting device preferably comprises two stop pistons, wherein the first stop piston is arranged in the first delivery chamber and the second stop piston is arranged in the second delivery chamber. In particular, the oscillating piston and the stop piston or pistons can be moved backward and forward in a cylindrical cavity of the housing. In particular, the stop piston or pistons can in each case be moved backward and forward between at least two oppositely oriented stops in the cylindrical cavity of the housing. However, the movement of the stop pistons serves only for the setting of the maximum volumes of the delivery chambers. During the operation of the metering pump, the stop pistons remain fixed and, in particular, form stops for the oscillating piston.

Very simple and robust construction is thereby advantageously provided for a metering pump which can withstand very high delivery pressures and the metering volume of which can be set in a flexible manner. If the spacing of the two stops is different in the respective delivery chambers, four different delivery ranges can in this way be provided for the metering pump, and just one stop piston or both stop pistons have in each case to be moved from one stop to the other stop in order to vary the delivery range.

In particular, the stop pistons can be moved on the same axis as the oscillating piston. This makes it possible for the cavity in the housing which accommodates the oscillating piston and the stop pistons to be formed at low cost as a cylindrical bore.

According to a development of the metering pump according to the invention, the stop piston communicates with the hydraulic drive at a first stop piston surface, which lies outside the delivery chamber assigned to said stop piston. Accordingly, said stop piston surface can be supplied with the hydraulic fluid, with the result that a force that counteracts an enlargement of the associated delivery chamber is exerted on the stop piston. In particular, this first stop piston surface is larger than each of the driving surfaces of the oscillating piston. This ensures that the force exerted on the stop piston from the side of the first stop piston surface is greater than the force which is exerted on the stop piston from the side of the associated delivery chamber when the fluid is delivered from said delivery chamber.

According to another embodiment of the metering pump according to the invention, the stop piston communicates with the hydraulic drive at a second stop piston surface, which lies outside the delivery chamber assigned to said stop piston. This second stop piston surface can be supplied with the hydraulic fluid in such a way that a force that counteracts a reduction in the size of the associated delivery chamber is exerted on the stop piston. In particular, the second stop piston surface is smaller than the first stop piston surface. Supplying the second stop piston surface with hydraulic fluid prevents a reduction in the size of the associated delivery chamber during the intake of fluid into the corresponding delivery chamber.

According to a development of the metering pump according to the invention, at least one of the delivery chambers, preferably both delivery chambers, is (are) assigned at least two outlet lines. In this case, at least two different maximum volumes can be set in such a way by means of the adjusting device that, at a first maximum volume, at least one outlet line opens into the delivery chamber and, at a second maximum volume, only the other of the two outlet lines opens into the delivery chamber. In particular, at a first maximum volume the two outlet lines open into the delivery chamber and, at the second maximum volume, only the other outlet line opens into the delivery chamber.

According to another, second aspect of the invention, a metering pump is provided, which can comprise not only a hydraulic drive but also a drive of some other kind, e.g. an electric or pneumatic drive. The metering pump according to this second aspect comprises a housing and an oscillating piston, which is accommodated in the housing in such a way that a first and a second delivery chamber are formed. The metering pump furthermore comprises a drive, which is coupled to the oscillating piston in such a way that the oscillating piston can be moved backward and forward between a first and a second position by means of the drive, wherein, during the movement from the first to the second position, the volume of the first delivery chamber is enlarged and the volume of the second delivery chamber is reduced and, during a movement from the second to the first position, the volume of the second delivery chamber is enlarged and the volume of the first delivery chamber is reduced. This metering pump is distinguished by the fact that it has an adjusting device, which is coupled to the oscillating piston in such a way that the movement of the oscillating piston can be limited in such a way that different minimum and/or maximum volumes can be set for at least a first of the delivery chambers. At least said first delivery chamber is assigned at least two outlet lines. By means of the adjusting device, at least two different maximum volumes can be set in such a way that, at a first maximum volume, at least one outlet line opens into the first delivery chamber and, at a second maximum volume, only the other of the two outlet lines opens into the first delivery chamber. At the first maximum volume, the two outlet lines, in particular, open into the delivery chamber, whereas, at the second maximum volume, only the other of the two outlet lines opens into the delivery chamber.

The metering pump according to the second aspect of the invention can advantageously be employed if the delivery volume is to be adjustable over a very wide range while nevertheless ensuring accurate metering.

The metering pump according to the second aspect of the invention can furthermore advantageously be employed in conjunction with fluids in which sedimentation of solid particles is likely to occur. In such a case, it is necessary to agitate or circulate the fluid supply before metering the fluid. The metering pump according to the invention can advantageously be used both for metering and for agitating or circulating the fluid supply. With the metering pump according to the invention, it is possible accurately to meter a relatively small volume flow and, at the same time, also to deliver a relatively high volume flow for agitation and circulation of the fluid to be metered. By means of the adjusting device, it is possible to change between these two operating modes easily and quickly.

As with the metering pump according to the invention in accordance with the first aspect of the invention, the metering pump according to the second aspect of the invention can also comprise a stop piston, which limits the volume of the first delivery chamber, which is assigned to the stop piston. In this way, the stroke of the oscillating piston, in particular, is limited.

The adjusting device preferably comprises two stop pistons, wherein the first stop piston is arranged in the first delivery chamber and the second stop piston is arranged in the second delivery chamber. In particular, the oscillating piston and the stop piston or pistons can be moved backward and forward in a cylindrical cavity of the housing. In particular, the stop piston or pistons can in each case be moved backward and forward between at least two oppositely oriented stops in the cylindrical cavity of the housing. However, the movement of the stop pistons serves only for the setting of the maximum volumes of the delivery chambers. During the operation of the metering pump, the stop pistons remain fixed and, in particular, form stops for the oscillating piston.

Very simple and robust construction is thereby advantageously provided for a metering pump which can withstand very high delivery pressures and the metering volume of which can be set in a flexible manner. If the spacing of the two stops is different in the respective delivery chambers, four different delivery ranges can in this way be provided for the metering pump, and just one stop piston or both stop pistons have in each case to be moved from one stop to the other stop in order to vary the delivery range.

In particular, the stop pistons can be moved on the same axis as the oscillating piston. This makes it possible for the cavity in the housing which accommodates the oscillating piston and the stop pistons to be formed at low cost as a cylindrical bore.

According to a development of the metering pump according to the invention in accordance with the second aspect of the invention, the metering pump comprises a hydraulic drive for supplying a hydraulic fluid under pressure. In this case, the oscillating piston is accommodated in the housing in such a way that at least a first and a second hydraulic chamber and a first and a second delivery chamber are formed. The oscillating piston has at least a first driving surface in the first hydraulic chamber and at least a second driving surface in the second hydraulic chamber. The hydraulic chambers communicate with the hydraulic drive, thus enabling the oscillating piston to be moved backward and forward between the first and the second position by the hydraulic fluid.

In particular, the two driving surfaces are aligned in such a way relative to the hydraulic chambers that a pressure of the hydraulic fluid in the first hydraulic chamber on the first driving surface moves the oscillating piston from the first to the second position and a pressure of the hydraulic fluid in the second hydraulic chamber on the second hydraulic surface moves the oscillating piston from the second to the first position.

In particular, the two delivery chambers are completely separate from one another. They each have at least one inlet line and one outlet line, which open into the respective delivery chamber.

In particular, the oscillating piston has two sides. On the first side, the oscillating piston has a first delivery surface in the first delivery chamber. In particular, this first delivery surface is aligned in exactly the same way as the first driving surface. On the other side, the oscillating piston likewise has a second delivery surface, which is arranged in the second delivery chamber and is aligned in the same way as the second driving surface.

According to one embodiment of the metering pump according to the invention, the two driving surfaces are of annular design. The two delivery surfaces can be in the form of circular disks, for example. In particular, they are formed on the two end faces of the oscillating piston. The driving surfaces can be formed by projections in the central area of the oscillating piston, for example.

According to a development of the metering pump according to the invention, the stop piston communicates with the hydraulic drive at a first stop piston surface, which lies outside the delivery chamber assigned to said stop piston. Accordingly, said stop piston surface can be supplied with the hydraulic fluid, with the result that a force that counteracts an enlargement of the associated delivery chamber is exerted on the stop piston. In particular, this first stop piston surface is larger than each of the driving surfaces of the oscillating piston. This ensures that the force exerted on the stop piston from the side of the first stop piston surface is greater than the force which is exerted on the stop piston from the side of the associated delivery chamber when the fluid is delivered from said delivery chamber.

According to another embodiment of the metering pump according to the invention, the stop piston communicates with the hydraulic drive at a second stop piston surface, which lies outside the delivery chamber assigned to said stop piston. This second stop piston surface can be supplied with the hydraulic fluid in such a way that a force that counteracts a reduction in the size of the associated delivery chamber is exerted on the stop piston. In particular, the second stop piston surface is smaller than the first stop piston surface. Supplying the second stop piston surface with hydraulic fluid prevents a reduction in the size of the associated delivery chamber during the intake of fluid into the corresponding delivery chamber.

The invention furthermore relates to a metering system for mixing two fluids. The metering system comprises one of the metering pumps described above in accordance with the first or second aspect of the invention. The metering system furthermore has a first tank for the first fluid, which is in fluid communication with the first delivery chamber of the metering pump via a first inlet line, and a second tank for the second fluid, which is in fluid communication with the second delivery chamber of the metering pump via a second inlet line. In the metering system according to the invention, the outlet line of the first delivery chamber and the outlet line of the second delivery chamber are brought together for metered mixing of the fluids. In this way, two fluids can be mixed with one another very easily and quickly and simultaneously delivered. In this case, the mixing ratio of the two fluids can be set by means of the adjusting device of the metering pump.

If the two delivery chambers have the same maximum volume, the mixing ratio obtained is 1:1. If the maximum volume of the two delivery chambers differs, a different mixing ratio can accordingly be obtained.

According to the invention, a metering system for metering at least one fluid is furthermore provided. In this case, the metering system comprises one of the metering pumps described above in accordance with the first or second aspect of the invention, which has the adjusting device, wherein the first delivery chamber is assigned a first and a second outlet line, as described above. The metering system furthermore comprises a tank for the fluid to be metered, which is in fluid communication with the first and the second delivery chamber of the metering pump via an inlet line. The other of the two outlet lines of the first delivery chamber is furthermore a metering line for metering the fluid. On the other hand, one of the two outlet lines of the first delivery chamber is in fluid communication with the tank, thus enabling fluid to be pumped back into the tank via one outlet line in order to circulate the fluid present in the tank. The fluid present in the tank can thus be agitated by means of one of the two outlet lines.

This metering system can advantageously be employed in conjunction with fluids, in particular plant protection products, with a tendency for the sedimentation of solids. By means of the adjusting device of the metering pump, the metering pump can initially be switched to a circulation mode, thus ensuring that the fluid to be metered is initially agitated. A change to the metering mode can then be made, and a relatively small fluid flow can be discharged via the metering line.

According to a development of this metering system according to the invention, at least two different maximum volumes can be set in such a way by means of the adjusting device that, at a first maximum volume, the two outlet lines open into the first delivery chamber and, at a second maximum volume, only the other of the two outlet lines opens into the first delivery chamber. In this case, a first valve is, in particular, arranged in one of the two outlet lines and the second valve is arranged in the other of the two outlet lines. Here, the opening pressure of the second valve is higher than the opening pressure of the first valve. Thus, when the two outlet lines open into the first delivery chamber at a first maximum volume, the pressure exerted by the oscillating piston on the fluid can be chosen so that only the first valve in one outlet line opens, whereas the second valve in the other outlet line remains closed. This ensures that the metering pump operates in circulation mode even though both outlet lines open into the delivery chamber and, in particular, the other outlet line is not covered by the adjusting device.

The invention is now explained by means of examples with reference to the figures.

Figure 2:
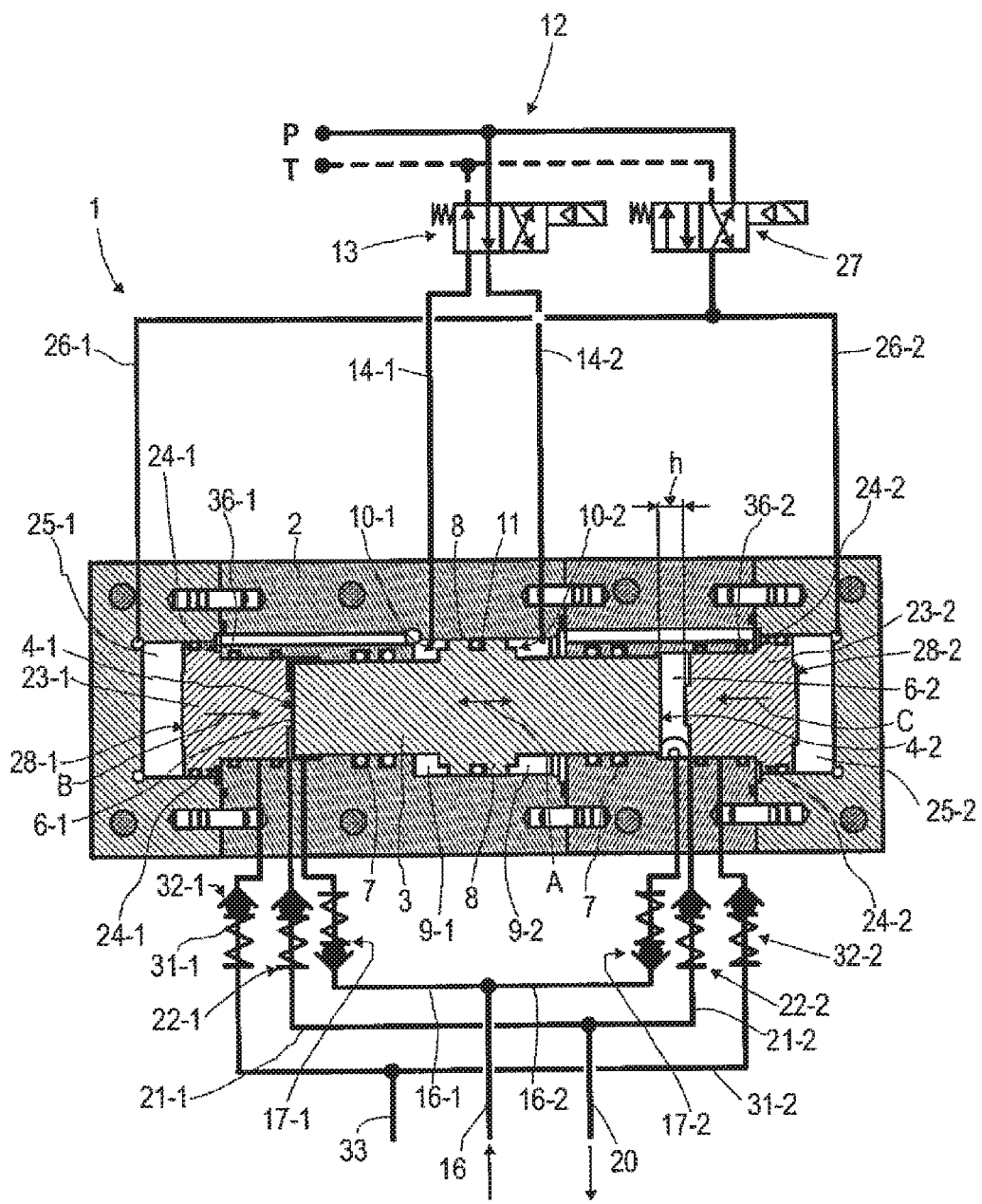
Figure 3:
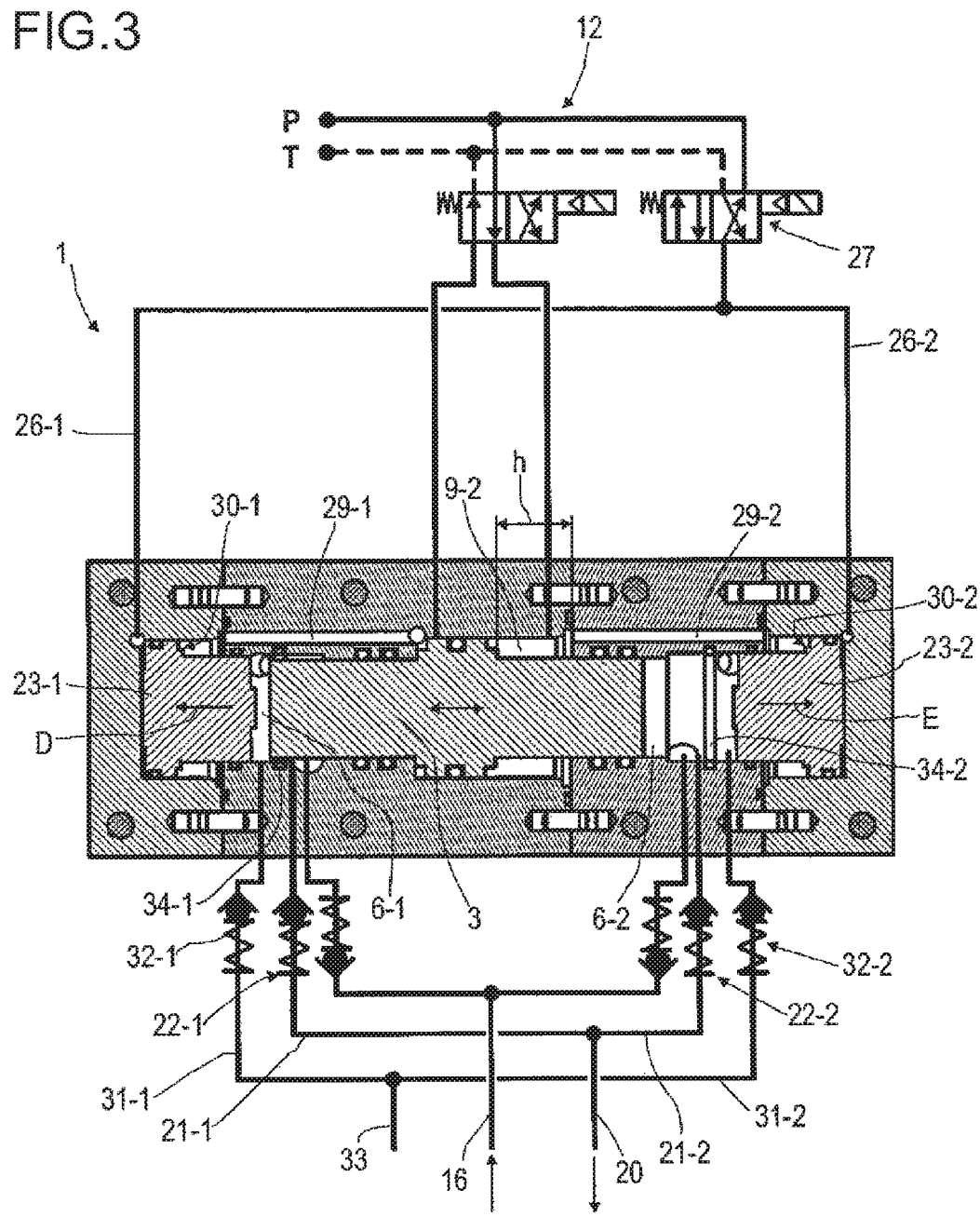
Figure 4:
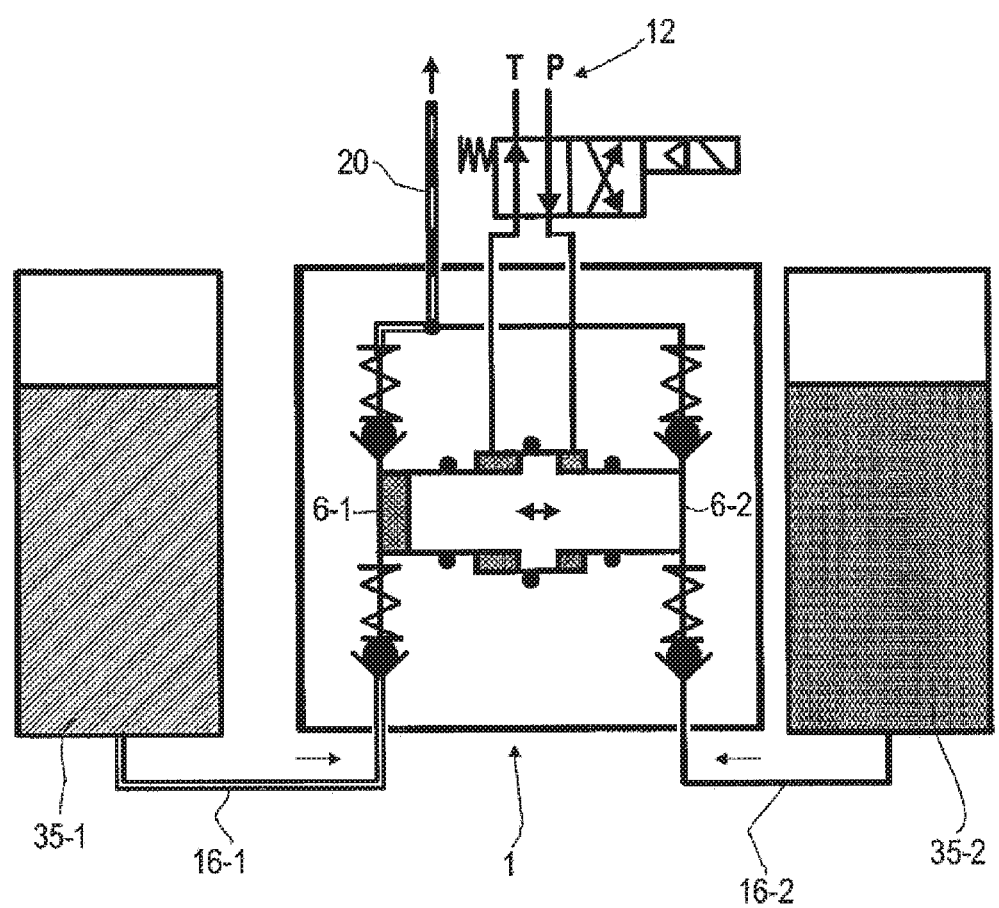
Figure 5:
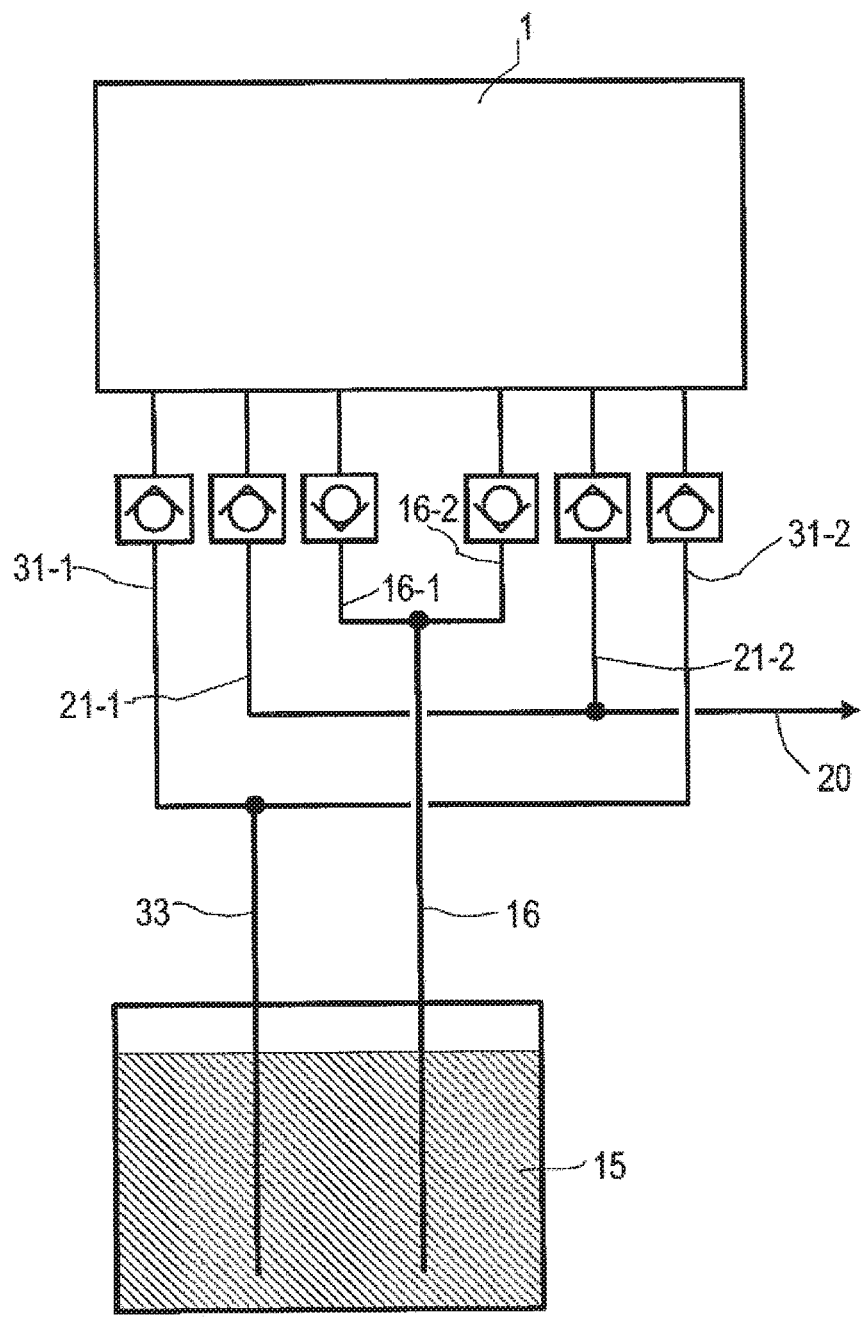

FIG. 1 shows a first example of the metering pump according to the invention, which is integrated into a first example of the metering system according to the invention, FIG. 2 shows a second example of the metering pump according to the invention in a metering state, FIG. 3 shows the second example of the metering pump in a circulation state, FIG. 4 shows the first example of the metering pump, which is integrated into a second example of the metering system according to the invention, and FIG. 5 shows diagrammatically the construction of a third example of the metering system according to the invention.

The first example of the metering pump according to the invention and the first example of the metering system according to the invention are described below with reference to FIG. 1:

The metering pump 1 comprises a housing 2, in which a cavity is formed. The cavity has the shape of two concentric cylinders, wherein the cylinder with the smaller diameter is longer than the cylinder with the larger diameter. An oscillating piston 3 is accommodated movably in the cavity of the housing 2. The oscillating piston 3 can be moved backward and forward between a first position and a second position in the cavity, in the direction of arrow A. In the first position of the oscillating piston 3, the first delivery surface 4-1 abuts the first housing wall 5-1. The oscillating piston 3 is then on the left hand side of the cavity of the housing 2 in FIG. 1. On the other side of the oscillating piston 3, the right-hand side in FIG. 1, a second delivery chamber 6-2 is then formed, which has its maximum volume in this first state of the oscillating piston 3. In the second position of the oscillating piston 3, which is shown in FIG. 1 and in which said piston is situated on the right-hand side of the cavity of the housing 2 in FIG. 1, the second delivery surface 6-2 of the oscillating piston 3 abuts the housing wall 5-2, with the result that the second delivery chamber 6-2 has its minimum volume of zero. On the other side, the left-hand side in FIG. 1, a first delivery chamber 6-1 is formed in this position of the oscillating piston 3. The maximum volume of this first delivery chamber 6-1 is equal to the maximum volume of the second delivery chamber 6-2.

The shape of the oscillating piston 3 is cylindrical. It corresponds to the size of the cylinder which forms the cylindrical cavity in the housing 2 which has the smaller diameter. To seal off the delivery chambers 6-1 and 6-2 during the backward and forward movement of the oscillating piston 3, sealing rings 7 are provided. Two mutually separate delivery chambers 6-1 and 6-2 are thus formed.

In the center, the oscillating piston 3 has an annular projection 8. This projection 8 extends into the region of the cavity in the housing 2 which is formed by the cylinder with the larger diameter of the cylindrical cavity. The annular projection 8 divides said region into a first hydraulic chamber 9-1 and a second hydraulic chamber 9-2. A first driving surface 10-1 is formed on the annular projection 8, said surface being directed into the first hydraulic chamber 9-1 and delimiting the latter. A second driving surface 10-2 is formed on the opposite side on the annular projection 8, said surface being directed into the second hydraulic chamber 9-2 and delimiting the latter. In order to seal off the two hydraulic chambers 9-2 and 9-1 from one another during a backward and forward movement of the oscillating piston 3, a further sealing ring 11 is provided. Two mutually separate hydraulic chambers 9-2 and 9-1 are thus formed.

During a movement of the oscillating piston 3 from the first position to the second position, the volume of the first delivery chamber 6-1 is thus enlarged, and the volume of the second delivery chamber 6-2 is reduced. Conversely, during a movement of the oscillating piston 3 from the second position to the first position the volume of the first delivery chamber 6-1 is reduced and the volume of the second delivery chamber 6-1 is enlarged.

A hydraulic drive 12 is provided for moving the oscillating piston 3. This hydraulic drive 12 supplies a hydraulic fluid under pressure. Hydraulic fluid under pressure is pumped into the first hydraulic chamber 9-1 by the hydraulic drive 12 via a valve 13 and a first hydraulic line 14-1. In the first hydraulic chamber 9-1, the hydraulic fluid applies a pressure to the first driving surface 10-1 and thereby moves the oscillating piston 3 from the first position to the second position, i.e. to the right in the illustration according to FIG. 1. During this movement, the hydraulic fluid in the second hydraulic chamber 9-2 is not subjected to pressure. Hydraulic fluid under pressure can furthermore be pumped into the second hydraulic chamber 9-2 via the valve 13 and a second hydraulic line 14-2. The oscillating piston 3 is thereby moved from the second to the first position, i.e. to the left in the illustration according to FIG. 1. In this case, the hydraulic fluid in the first hydraulic chamber 9-1 is not subjected to pressure. If hydraulic fluid under alternating pressure is then alternately pumped into the hydraulic chamber 9-1 and 9-2, the oscillating piston 3 can be moved backward and forward in the direction of the arrow A. The hydraulic chambers 9-1, 9-2 thus communicate with the hydraulic drive 12, enabling the oscillating piston 3 to be moved backward and forward between the first and the second position by the hydraulic fluid.

The fluid to be metered can enter the first delivery chamber 6-1 from a tank 15 via a first inlet line 16-1 and a first inlet valve 17-1. The fluid present in the tank 15 can likewise enter the second delivery chamber 6-2 via a second inlet line 16-2 and a second inlet valve 17-2. The inlet valves 17-1 and 17-2 are designed as intake valves. They are, for example, check valves, which permit a fluid flow only in the direction of the delivery chambers 6-1 and 6-2.

A first outlet line 18-1, in which a first outlet valve 19-1 is arranged, furthermore opens into the first delivery chamber 6-1. A second outlet line 18-2, in which a second outlet valve 19-2 is arranged, likewise opens into the second delivery chamber 6-2. The two outlet valves 19-1 and 19-2 are also designed as check valves, which permit a fluid flow only outward from the delivery chambers 6-1 and 6-2. The opening forces of the outlet valves 19-1 and 19-2 are less than the forces exerted by the pressures which can be produced by the delivery surfaces 4-1 and 4-2 of the oscillating piston 3. The two outlet lines 18-1 and 18-2 are combined into a metering line 20.

The metering pump 1 and the metering system which is operated with the metering pump 1 are operated as follows:

The fluid to be metered is situated in the tank 15. The hydraulic drive 12 moves the oscillating piston 3 backward and forward in the direction of the arrow A. During a movement from the first position to the second position of the oscillating piston 3, fluid is thereby sucked into the first delivery chamber 6-1 via the inlet line 16-1 and the inlet valve 17-1. At the same time, the fluid present in the second delivery chamber 6-2 is pumped out of this second delivery chamber 6-2 into the second outlet line 18-2 via the second outlet valve 19-2. Conversely, during the movement of the oscillating piston 3 from the second position to the first position, fluid is sucked into the second delivery chamber 6-2 via the second inlet line 16-2 and the second inlet valve 17-2. At the same time, the fluid present in the first delivery chamber 6-1 is pumped into the first outlet line 18-1 via the first outlet valve 19-1.

During the backward and forward movement of the oscillating piston 3, the acceleration of the oscillating piston 3 on the respective delivery side is damped or braked. This prevents the oscillating piston 3 from being accelerated too sharply and prevents the occurrence of excessive speeds. It is thereby possible to avoid cavitation in the delivery chambers 6-1 and 6-2. However, it is possible to use the hydraulic drive 12 which is arranged on an agricultural machine or a construction machine, for example.

By means of this metering system, a defined metered quantity is discharged via the metering line 20. Here, the volume delivered is obtained from the maximum volumes of the two delivery chambers 6-1 and 6-2 and the number of cycles completed by the oscillating piston 3. During a movement from the first position to the second position of the oscillating piston 3, the maximum volume of the second delivery chamber 6-2 is discharged in the metering line 20. During the movement of the oscillating piston 3 from the second position to the first position, the maximum volume of the first delivery chamber 6-1 is discharged via the metering line 20.

A second example of the metering pump 1 according to the invention is explained with reference to FIG. 2:

In the description of the second example of the metering pump 1, the same reference signs are used for parts which are also included in the metering pump 1 of the first example.

As with the first example of the metering pump 1, the metering pump 1 of the second example also has a housing 2, in which a cavity is formed, in which an oscillating piston 3 is arranged, which can be moved backward and forward in the direction of the arrow A. On a first side, the oscillating piston 3 has a first delivery surface 4-1, at which a first delivery chamber 6-1 is formed, which has a minimum volume of zero in the state shown in FIG. 2. On the other side, the oscillating piston 3 has a second delivery surface 4-2, at which a second delivery chamber 6-2 is formed. In the state of the oscillating piston 3 shown in FIG. 2, this second delivery chamber 4-2 has its maximum volume, although, as explained below, this can be varied. The delivery chambers 6-1 and 6-2 are sealed off by sealing rings 7.

In this example of the metering pump 1 too, the oscillating piston 3 has an annular projection 8 in the center, said projection extending into a region of the cavity of the housing 2, with the result that two separate hydraulic chambers 9-1 and 9-2 are formed. The first driving surface 10-1 of the oscillating piston 3 is arranged in the first hydraulic chamber 9-1. The second driving surface 10-2 of the oscillating piston 3 is arranged in the second hydraulic chamber 9-2. The two hydraulic chambers 9-1 and 9-2 are sealed off from one another by a sealing ring 11.

In the second example of the metering pump 1 too, the oscillating piston 3 is driven by a hydraulic drive 12, i.e. moved backward and forward in the direction of the arrow A. However, attention is drawn to the fact that, in the case of the second example of the metering pump 1, said pump could also be driven by some other kind of drive, e.g. by a pneumatic or an electric drive.

The hydraulic drive 12 supplies a hydraulic fluid under pressure, which is pumped alternately into the first and second hydraulic chambers 9-1, 9-2 via the valve 13 and in this way drives the backward and forward movement of the oscillating piston 3. For this purpose, the hydraulic drive 12 is connected to the hydraulic chambers 9-1 and 9-2 via the hydraulic lines 14-1 and 14-2. The hydraulic chambers 9-1, 9-2 thus communicate with the hydraulic drive 12, enabling the oscillating piston 3 to be moved backward and forward between the first and the second position by the hydraulic fluid.

The fluid to be metered is sucked in via an inlet line 16, which branches into a first 16-1 and a second inlet line 16-2. The first inlet line 16-1 opens into the first delivery chamber 6-1 via a first inlet valve 17-1. The second inlet line 16-2 opens into the second delivery chamber 6-2 via a second inlet valve 17-2. During a movement of the oscillating piston 3 from the first to the second position, the volume of the first delivery chamber 6-1 increases, and the fluid is sucked out of the first inlet line 16-1 into the first delivery chamber 6-1. Conversely, during a movement of the oscillating piston 3 from the second position to the first position, during which the volume of the second delivery chamber 6-2 increases, fluid is sucked into the second delivery chamber 6-2 via the second inlet line 16-2.

A first outlet line 21-1, in which a first outlet valve 22-1 is arranged, furthermore opens into the first delivery chamber 6-1. The first outlet line 21-1 corresponds to the first outlet line 18-1 of the first example. A second outlet line 21-2, in which a second outlet valve 22-2 is arranged, furthermore also opens into the second delivery chamber 6-2. The second outlet line 21-2 corresponds to the second outlet line 18-2 of the first example. The two outlet lines 21-1 and 21-2 open into a metering line 20.

In the state shown in FIG. 2, the metering pump 1 of the second example is operated in the same way as the metering pump 1 of the first example. The oscillating piston 3 is moved backward and forward by the hydraulic drive 12. In this process, fluid is sucked alternately into the delivery chambers 6-1 and 6-2 from the inlet lines 16-1 and 16-2 and delivered via the outlet lines 21-1 and 21-2. In this way, a defined fluid volume or a defined fluid flow can be produced in the metering line 20.

In contrast to the metering pump 1 of the first example, however, the metering pump 1 of the second example has an adjusting device by means of which the movement of the oscillating piston 3 can be limited. In this way, the maximum volumes of the delivery chambers 6-1 and 6-2 can be varied. The adjusting device comprises a first stop piston 23-1. This first stop piston 23-1 is also accommodated in the cavity of the housing 2. It delimits the first delivery chamber 6-1 on the surface facing the oscillating piston 3. At this surface, it furthermore forms a stop for the first delivery surface 4-1 of the oscillating piston 3.

In the position of the first stop piston 23-1, which is shown in FIG. 2, the first stop piston 23-1 reduces the maximum delivery volume of the first delivery chamber 6-1. For this purpose, the first stop piston 23-1 is pressed against a stop 24-1 in the direction of arrow B. In order to produce this pressure, a first pressure chamber 25-1 is formed on that side of the first stop piston 23-1 which faces away from the oscillating piston 3. A third hydraulic line 26-1 opens into this first pressure chamber 25-1. By means of the hydraulic drive 12 and a valve 27, hydraulic fluid can be pumped into the first pressure chamber 25-1, with the result that the hydraulic fluid exerts a pressure on the end face 28-1 of the first stop piston 23-1 in the direction of arrow B. The end face 28-1 on which the hydraulic fluid acts is larger than the driving surfaces 10-1 and 10-2 of the oscillating piston 3. This ensures that the stop piston 23-1 is not moved away from the first stop 24-1 during a movement of the oscillating piston 3 from the second position to the first position.

A second stop piston 23-2 is provided in the same way on the other side of the oscillating piston. It is pushed against a second stop 24-2 in the direction of arrow C. For this purpose, a second pressure chamber 25-2 is formed, into which a fourth hydraulic line 26-2 opens. The hydraulic drive 12 can provide pressurized hydraulic fluid in the second pressure chamber 25-2 via the valve 27 and the fourth hydraulic line 26-2 and ensure that the second stop piston 23-2 is not moved away from the second stop 24-2 during the movement of the oscillating piston 3 from the first to the second position. For this purpose, a pressure in the direction of the arrow C is exerted on the end face 28-2 of the second stop piston 23-2.

The first pressure chamber 25-1 is sealed off from the first delivery chamber 6-1 by a sealing ring 36-1. The second pressure chamber 25-2 is sealed off from the second delivery chamber 6-2 by a sealing ring 36-2.

In the position of the first stop piston 23-1 and the second stop piston 23-2 which is shown in FIG. 2, the oscillating piston 3 performs the stroke h. The fluid volume delivered by the metering pump 1 during one cycle of the oscillating piston 3 is the product of the size of said stroke h and the size of the delivery surfaces 25-1 and 25-2.

The maximum volumes of the delivery chambers 6-1 and 6-2 can be varied by moving the stop pistons 23-1 and 23-2. FIG. 3 shows a position of the stop pistons 23-1 and 23-2 in which the maximum volumes of both delivery chambers 6-1 and 6-2 have been enlarged. In this case, the stroke h of the oscillating piston 3 is larger than the stroke h in the position of the two stop pistons 23-1 and 23-2 according to FIG. 2.

The modified position of the stop pistons 23-1 and 23-2 is explained below with reference to FIG. 3:

In this state, the pressure chambers 25-1 and 25-2 are not supplied with pressurized hydraulic fluid via the third and fourth hydraulic lines 26-1 and 26-2. However, hydraulic fluid is passed via a first duct 29-1 from the first hydraulic chamber 9-1 to an annular first stop piston surface 30-1 of the first stop piston 23-1. By means of this connection, a hydraulic pressure is exerted on the first stop piston surface 30-1 whenever the oscillating piston 3 moves back to suck in fluid, the exertion of pressure being intended to ensure that the first stop piston 23-1 remains fixed against the rear-side stop thereof on the housing 2 in the direction of arrow D when fluid is sucked into the first delivery chamber 6-1. Thus, the vacuum during the intake of the fluid cannot move the first stop piston 23-1.

A duct 29-2 is likewise formed on the other side of the oscillating piston 3, connecting the second hydraulic chamber 9-2 to an annular second stop piston surface 30-2 of the second stop piston 23-2. This ensures in the same way that the second stop piston 23-2 remains fixed against the rear-side stop thereof on the housing 2 in the direction of arrow E when fluid is sucked into the second delivery chamber 6-2. Thus, the vacuum during the intake of the fluid cannot move the second stop piston 23-2 either.

In the position of the two stop pistons 23-1 and 23-2 which is shown in FIG. 3, the following difference in fluid delivery is obtained relative to the state of the stop pistons 23-1 and 23-2 which is shown in FIG. 2:

A further, third outlet line 31-1, in which a third outlet valve 32-1 is arranged, opens into the first delivery chamber 6-1. A fourth outlet line 31-2, in which a fourth outlet valve 32-2 is arranged, likewise also opens into the second delivery chamber 6-2.

A further sealing ring 34-1 is provided between the opening of the third outlet line 31-1 into the first delivery chamber 6-1 and the opening of the first outlet line 22-1 into the first delivery chamber 6-1. A sealing ring 34-2 is likewise provided between the opening of the fourth outlet line 31-2 and of the second outlet line 21-2 into the second delivery chamber 6-2.

However, in the position of the stop pistons 23-1 and 23-2 according to FIG. 2, the openings of the outlet lines 31-1 and 31-2 into the delivery chambers 6-1 and 6-2 are closed by the stop pistons 23-1 and 23-2. In the position of the stop pistons 23-1 and 23-2 according to FIG. 3, however, the two stop pistons 23-1 and 23-2 expose the openings of the third and fourth outlet lines 31-1 and 31-2. It is thus possible for the fluid to be delivered not only into the outlet lines 21-1 and 21-2 but also into the outlet lines 31-1 and 31-2.

The opening pressure for the third and fourth outlet valves 32-1 and 32-2 is now chosen so that it is lower than the opening pressure for the first outlet valve 22-1 and the second outlet valve 22-2. In the positions of the stop pistons 23-1 and 23-2 which are shown in FIG. 3, the oscillating piston 3 is now driven by the hydraulic drive 12 in such a way that the delivery pressure in the delivery chambers 6-1 and 6-2 is higher than the opening pressure of the third and fourth outlet valves 32-1 and 32-2 but lower than the opening pressure of the first and second outlet valves 22-1 and 22-2. In this state of the stop pistons 23-1 and 23-2, fluid is thus alternately delivered from the delivery chambers 6-1 and 6-2 into outlet lines 31-1 and 31-2. The third and fourth outlet lines 31-1 and 31-2 are combined into a recirculation line 33.

In the position of the stop pistons 23-1 and 23-2 which is shown in FIG. 2, the metering pump 1 is operated in metering mode. Fluid is delivered into the metering line 20. In contrast, in the position of the stop pistons 23-1 and 23-2 which is shown in FIG. 3, the metering pump 1 is operated in circulation mode. A relatively large fluid volume is delivered into the recirculation line 33, which can be used to agitate a fluid supply. Here, the fluid volume which can be delivered in recirculation mode is about 40 times greater than that in metering mode.

In further possible embodiments, the stop pistons 23-1 and 23-2 can also be in different positions. For example, the first slop piston 23-1 can be pressed against stop 24-1, as shown in FIG. 2, whereas the second stop piston 23-2 can be pressed against the rear-side stop thereof, as shown in FIG. 3. Conversely, it is also possible for the first stop piston 23-1 to be pressed against the rear-side stop thereof and for the second stop piston 23-2 to be in the position shown in FIG. 2. If the distances between the stops for the two stop pistons 23-1 and 23-2 are different, up to four different metering or recirculation ranges can be selected. Moreover, if the opening pressures of the outlet valves 21-1, 21-2, 32-1 and 32-2 are variable, it is furthermore possible to specify whether, in the respective positions of the two stop pistons 23-1 and 23-2, the fluid in the respective region is metered or used to agitate a fluid supply.

Moreover, provision can be made for the position of the stops 24-1 and 24-2 to be variable in order, in this way, continuously to vary the maximum volume of the two delivery chambers 6-1 and 6-2.

In the second example of the metering pump 1 too, the movement of the oscillating piston 3 is damped and braked by the respective delivery of the fluid from the delivery chambers 6-1 and 6-2, thus avoiding the occurrence of cavitation on the intake side.

A second example of the metering system according to the invention is described with reference to FIG. 4:

The metering system comprises a metering pump. It is possible to use either the metering pump 1 described with reference to FIG. 1 or the metering pump 1 described with reference to FIGS. 2 and 3. If the metering pump 1 described with reference to FIG. 1 is used, the hydraulic drive 12 is also provided. If the metering pump 1 described with reference to FIGS. 2 and 3 is employed, it is also possible for a drive of some other type to be provided.

In this case, the first inlet line 16-1 is connected to a first tank 35-1 for a first fluid to be metered. The second inlet line 16-2 is connected to a second tank 35-2 for a second fluid to be metered. As a departure from the examples described above, the two inlet lines 16-1 and 16-2 are not connected to one another. During the operation of the metering pump 1, fluid is thus delivered via inlet line 16-1 from the first tank 35-1 to the first delivery chamber 6-1, and the fluid present in the second tank 35-2 is delivered via the second inlet line 16-2 to the second delivery chamber 6-2. From the two delivery chambers 6-1 and 6-2, the two different fluids are fed into the common metering line 20. The two fluids are thereby mixed together in this metering system. The mixing ratio here is determined by the size of the delivery chambers 6-1 and 6-2. If the volume of these delivery chambers 6-1 and 6-2 is identical, the mixing ratio is 1:1. If the volumes of the two delivery chambers 6-1 and 6-2 are different, the mixing ratio changes accordingly.

If the metering pump 1 described with reference to FIGS. 2 and 3 is used, the mixing ratio can be modified by changing the position of the stop pistons 23-1 and 23-2.

In yet another example of the metering system according to the invention, the metering pump 1 described with reference to FIGS. 2 and 3 is employed in the metering system described in other respects in FIG. 1.

Finally, yet another example of a metering system is explained with reference to FIG. 5:

In this case, the metering pump 1 described with reference to FIGS. 2 and 3 is employed in the metering system. In the position of the stop pistons 23-1 and 23-2 which is explained with reference to FIG. 2, a fluid is sucked out of a tank 15 via the inlet lines 16, 16-1 and 16-2 and delivered into the metering line 20, as explained with reference to FIG. 2. However, if the position of the stop pistons 23-1 and 23-2 is changed in such a way that the position of the stop pistons 23-1 and 23-2 is that shown in FIG. 3, the fluid is sucked in from the tank 15 but pumped into the recirculation line 33. Since, in this case, the stroke h of the oscillating piston 3 is a multiple of the stroke h of the oscillating piston 3 in the position of the stop pistons 23-1 and 23-2 which is shown in FIG. 2, a significantly larger volume flow is produced in this state of recirculation. This volume flow of the fluid is fed back into the tank 15 via the recirculation line 33, thereby agitating the fluid present in the tank 15. By this means, it is possible to avoid sedimentation of solid particles on the bottom of the tank 15.

LIST OF REFERENCE SIGNS 1 metering pump
2 housing 3 oscillating piston
4-1 first delivery surface
4-2 second delivery surface
5-1 first housing surface
5-2 second housing surface
6-1 first delivery chamber
6-2 second delivery chamber
7 sealing rings
8 projection of the oscillating piston 3
9-1 first hydraulic chamber
9-2 second hydraulic chamber
10-1 first driving surface
10-2 second driving surface
11 sealing ring
12 hydraulic drive
13 valve
14-1 first hydraulic line
14-2 second hydraulic line
15 tank
16 inlet line
16-1 first inlet line
16-2 second inlet line
17-1 first inlet valve
17-2 second inlet valve
18-1 first outlet line
18-2 second outlet line
19-1 first outlet valve
19-2 second outlet valve
20 metering line
21-1 first outlet line
21-2 second outlet line
22-1 first outlet valve
22-2 second outlet valve
23-1 first stop piston
23-2 second stop piston
24-1 first stop
24-2 second stop
25-1 first pressure chamber
25-2 second pressure chamber
26-1 third hydraulic line
26-2 fourth hydraulic line
27 valve
28-1 end face of the first stop piston 23-1
28-2 end face of the second stop piston 23-2
29-1 first duct
29-2 second duct
30-1 first stop piston surface
30-2 second stop piston surface
31-3 third outlet line
31-2 fourth outlet line
32-1 third outlet valve
32-2 fourth outlet valve
33 recirculation line
34-1 sealing ring
34-2 sealing ring
35-1 first tank
35-2 second tank
36-1, 36-2 sealing ring

The invention claimed is:

1. A metering pump having
a hydraulic drive for supplying a hydraulic fluid under pressure, a housing,
an oscillating piston, which is accommodated in the housing in such a way that at least a first and a second hydraulic chamber and a first and a second delivery chamber are formed, and
an adjusting device, which is coupled to the oscillating piston in such a way that the movement of the oscillating piston can be limited in such a way that different minimum and/or maximum volumes can be set for at least one of the delivery chambers,
wherein the oscillating piston has at least a first driving surface in the first hydraulic chamber and at least a second driving surface in the second hydraulic chamber, and the hydraulic chambers communicate with the hydraulic drive, thus enabling the oscillating piston to be moved backward and forward between a first and a second position by the hydraulic fluid,
wherein, during the movement from the first to the second position, the volume of the first delivery chamber is enlarged and the volume of the second delivery chamber is reduced and, during the movement from the second to the first position, the volume of the second delivery chamber is enlarged and the volume of the first delivery chamber is reduced
wherein the adjusting device comprises at least one stop piston having at least one stop piston surface, which limits the space in the delivery chamber which is assigned to the stop piston,
and
wherein the at least one stop piston communicates with the hydraulic drive at the at least one stop piston surface.

2. The metering pump of claim 1, wherein
the adjusting device comprises two stop pistons, wherein the first stop piston is arranged in the first delivery chamber and the second stop piston is arranged in the second delivery chamber.

3. The metering pump claim 1, wherein
the oscillating piston and the stop piston or pistons can be moved backward and forward in a cylindrical cavity of the housing.

4. The metering pump of claim 1, wherein
the stop piston or pistons can in each case be moved backward and forward between at least two oppositely oriented stops in the cylindrical cavity of the housing.

5. The metering pump of claim 1, wherein
at least one stop piston communicates with the hydraulic drive at a first stop piston surface, which lies outside the delivery chamber assigned to said stop piston, and can be supplied with the hydraulic fluid in such a way that a force that counteracts an enlargement of the associated delivery chamber is exerted on the stop piston.

6. The metering pump of claim 1, wherein
at least one stop piston communicates with the hydraulic drive at a second stop piston surface, which lies outside the delivery chamber assigned to said stop piston, and can be supplied with the hydraulic fluid in such a way that a force that counteracts a reduction in the size of the associated delivery chamber is exerted on the stop piston.

7. The metering pump of claim 1, wherein
at least one of the delivery chambers is assigned at least two outlet lines and at least two different maximum volumes can be set in such a way by means of the adjusting device that, at a first maximum volume, at least one outlet line opens into the delivery chamber and, at a second maximum volume, only the other of the two outlet lines opens into the delivery chamber.

8. A metering system for mixing two fluids, having the metering pump of claim 1, a first tank for the first fluid, which is in fluid communication with the first delivery chamber of the metering pump via a first inlet line, and a second tank for the second fluid, which is in fluid communication with the second delivery chamber of the metering pump via a second inlet line, wherein the outlet line of the first delivery chamber and the outlet line of the second delivery chamber are combined for metered mixing of the fluids.

9. A metering system for metering at least one fluid, having the metering pump of claim 7, at least one tank for the fluid to be metered, wherein the tank is in fluid communication with the first and the second delivery chamber of the metering pump via an inlet line, wherein the other of the two outlet lines of the first delivery chamber is a metering line for metering the fluid, and one of the two outlet lines of the first delivery chamber is in fluid communication with the tank, thus enabling fluid to be pumped back into the tank via one outlet line in order to circulate the fluid present in the tank.

10. The metering system of claim 9, wherein at least two different maximum volumes can be set in such a way by means of the adjusting device that, at a first maximum volume, the two outlet lines open into the first delivery chamber and, at a second maximum volume, only the other of the two outlet lines opens into the first delivery chamber.

11. The metering system of claim 9, wherein a first valve is arranged in one outlet line, and a second valve is arranged in the other outlet line, and the opening pressure of the second valve is higher than the opening pressure of the first valve.

* * * * *